(12) United States Patent
Poirier et al.

(10) Patent No.: US 12,291,992 B2
(45) Date of Patent: May 6, 2025

(54) FUEL SYSTEM FOR ENCLOSED GENERATOR

(71) Applicant: AXI INTERNATIONAL CORPORATION, Fort Myers, FL (US)

(72) Inventors: Jeffrey Donald Poirier, Cape Coral, FL (US); Anthony Michael Grippo, Fort Myers, FL (US)

(73) Assignee: AXI INTERNATIONAL CORPORATION, Fort Myers, FL (US)

( * ) Notice: Subject to any disclaimer, the term of this patent is extended or adjusted under 35 U.S.C. 154(b) by 254 days.

(21) Appl. No.: 17/617,206

(22) PCT Filed: Jun. 5, 2020

(86) PCT No.: PCT/US2020/036453
§ 371 (c)(1),
(2) Date: Dec. 7, 2021

(87) PCT Pub. No.: WO2020/247842
PCT Pub. Date: Dec. 10, 2020

(65) Prior Publication Data
US 2022/0298962 A1 Sep. 22, 2022

Related U.S. Application Data

(60) Provisional application No. 62/858,529, filed on Jun. 7, 2019.

(51) Int. Cl.
*F02B 63/04* (2006.01)
*B60K 15/03* (2006.01)

(52) U.S. Cl.
CPC ............. *F02B 63/04* (2013.01); *B60K 15/03* (2013.01)

(58) Field of Classification Search
CPC ........ F02B 63/04; F02B 63/044; B60K 15/03; B67D 7/04; B67D 7/78; F02M 37/0076;
(Continued)

(56) References Cited

U.S. PATENT DOCUMENTS

| 5,234,036 A | 8/1993 | Butkovich et al. |
| 6,203,631 B1 | 3/2001 | Bowen et al. |

(Continued)

FOREIGN PATENT DOCUMENTS

WO 2009032461 3/2009

OTHER PUBLICATIONS

Related Extended European Search Report regarding EP 20818750, dated Jun. 5, 2023 (7pgs.).
(Continued)

*Primary Examiner* — Joseph Ortega
(74) *Attorney, Agent, or Firm* — Hahn Loeser & Parks, LLP

(57) ABSTRACT

A fuel system for a generating unit disposed within an enclosure, the enclosure having an enclosure width and an enclosure height, includes a bulk fuel storage tank and a vertical day tank, a supply line and a return line. The vertical day tank has a tank width corresponding to the enclosure width, a tank height corresponding to the enclosure height, and a tank depth selected to provide an interior volume to meet fuel capacity requirements for the generating unit. The tank height and tank width both exceed the tank depth. The vertical day tank further has a fill port and an overfill port located at a top of the vertical day tank. The supply line runs from the bulk fuel tank to the fill port of the vertical day tank, and the return line runs from the overfill port of the vertical day tank to the bulk fuel storage tank.

4 Claims, 3 Drawing Sheets

(58) Field of Classification Search
CPC .. F02M 37/0088; F05D 2220/64; F01D 15/10
See application file for complete search history.

(56) References Cited

U.S. PATENT DOCUMENTS

| | | |
|---|---|---|
| 8,950,446 B2 | 2/2015 | Folken et al. |
| 2007/0152126 A1 | 7/2007 | Graham et al. |
| 2008/0185048 A1 | 8/2008 | Mellon et al. |
| 2012/0042855 A1* | 2/2012 | Vogely ............... F02M 37/0052 |
| | | 123/498 |
| 2012/0181795 A1 | 7/2012 | Lobsiger |
| 2013/0133750 A1* | 5/2013 | Lescure ............ F02M 37/0076 |
| | | 137/486 |
| 2019/0106316 A1 | 4/2019 | Van Vliet et al. |
| 2022/0298962 A1* | 9/2022 | Poirier .................... B67D 7/04 |

OTHER PUBLICATIONS

International Search Report regarding PCT/US20/36453, dated Oct. 13, 2020 (3 pgs,).
Written Opinion of the International Searching Authority regarding PCT/US20/36453, dated Oct. 13, 2020 (4 pgs,).

* cited by examiner

FUEL SYSTEM FOR ENCLOSED GENERATOR

RELATED APPLICATIONS

This application is a National Stage Entry of PCT/US20/36453, filed Jun. 5, 2020, which is a continuation in part of U.S. Provisional Application No. 62/858,529, filed Jun. 7, 2019, the entirety of both of which are incorporated by reference.

BACKGROUND

On-site backup/emergency electrical generation is often provided by one or more liquid-fueled electrical generator units. Such installations are common, for example, at mission-critical sites, such as hospitals. In such installations, the electrical generators may be enclosed in a rectangular enclosure, with a rectangular installed base tank, or belly tank, below the generator, providing enough fuel volume to run for a specific period. The base/belly tank is then refilled from a bulk storage tank when its fuel level gets low.

In such an application, the belly tank serves two purposes; fuel storage and support. When coupling such a belly tank with a bulk storage tank, fuel management is complicated by orienting the belly tank under the generator and, therefore, low and close to the ground, i.e., lower in elevation compared to the bulk storage tank. This requires a pump system to return fuel from the belly tank to the bulk storage tank. See, for example, U.S. Pat. No. 8,950,446, which is incorporated by reference Belly tanks also have disadvantages concerning fuel contamination. Since the generator on top of the belly tank weighs in excess of a few metric tons, baffled walls are used in these belly tanks to maintain structural integrity. This can have a negative impact on the flow within the tank as fluid is obstructed by these support structures. Belly tanks also have a very large plan view surface area which creates a large area of interface between fuel and water which exacerbates microbial growth between the fuel/water interface and also creates a large area for rust and corrosion.

While such generator units have advantages of providing electrical power on an emergency basis, in the absence of a power outage, fuel turnover is very low and only consumed during periodic equipment testing. Actual power outages may be few and far between, allowing for large volumes of stagnant fuel on site. This provides ample opportunity for fuel degradation and contamination.

Contamination may occur when microbial and fungal growth occurs during storage. Microbes and fungi require water and an energy source (fuel) to grow a colony. Water may condense inside fuel tank or be introduced with contaminated fuel. Water, being a higher specific gravity than fuel, tends to coalesce at the bottom of a fuel tank, underneath the fuel. The water-fuel boundary, when undisturbed, provides a prime ground for continued growth of a colony. Microbial and fungal growth lead to biodegradation of the fuel, acidification of the fuel, and sludge formation on the bottom of the tank.

Microbial and fungal growth leading to sludge formation, which, along with other impurities, and water itself, provides a number of problems for any fuel system, or engine. Such problems may not arise during periodic testing, when only small amounts of fuel are removed, but are more likely to arise during an actual power outage, when a large amount of fuel is suddenly consumed, thereby stirring sludge and other sediments which may have been accumulating. Once stirred up, the sludge, sediments and water may be drawn into the fuel pickup line for the generator, potentially overwhelming the filtering capabilities of the fuel system for the generator, clogging the filter and starving the generator of fuel.

Bulk stored fuel is typically stored in large cylindrical horizontal tanks. The nature of the cylindrical shape leads to a relatively small surface area between a small volume of water and a large volume of fuel, thereby reducing the area for microbial and fungal growth. In contrast, base/belly tanks for emergency generators are often rectangular and flat in shape so that a generator may be mounted on top of the tank. This increases the surface area of any fuel-water boundary and increases the rate of microbial and fungal activity.

The nature of diesel fuel leaving the refinery has also changed in recent years. In an effort to reduce harmful sulfur oxides (SOx), refineries are now required to reduce sulfur levels within fuel to levels below 15 Parts Per Million (PPM). Sulfur was once a prime component that aided in the prevention of microbial proliferation within stored fuel. The reduced sulfur levels in present day fuels lead to additional microbial growth and resulting sludge formation and fuel contamination.

To mitigate the problems with fuel contamination in emergency electrical generator fuel tanks, fuel polishing may be employed. Fuel polishing involves pumping fuel from the storage tank, through a water separator/filter, and returning the clean fuel to the storage tank. However, it may be difficult to remove contaminating fluids and sludge from horizontal, baffled belly tanks. Also, fuel polishing does not reduce the total potential area of a fuel/water interface where microbial and fungal growth can occur.

SUMMARY

A fuel system for a generating unit disposed within an enclosure, the enclosure having an enclosure width and an enclosure height, includes a bulk fuel storage tank and a vertically-oriented day tank, a supply line and a return line. The vertical day tank has a tank width corresponding to the enclosure width, a tank height corresponding to the enclosure height, and a tank depth selected to provide an interior volume to meet fuel capacity requirements for the generating unit. The tank height and tank width both exceed the tank depth. The vertical day tank further has a fill port and an overfill port located at a top of the vertical day tank. The supply line runs from the hulk fuel tank to the fill port of the vertical day tank, and the return line runs from the overfill port of the vertical day tank to the hulk fuel storage tank.

The overfill port is preferably located above a fuel level of the bulk fuel storage tank to provide a gravity-fed return line. The vertical day tank may be mounted on an end wall of the enclosure. The vertical day tank may provide an end wall of the enclosure. An area defined by the tank width and tank depth is substantially reduced relative to a belly tank of equivalent fuel capacity.

The fuel system may further comprise a plurality of day tanks associated with a plurality of respective generating units and enclosures, each day tank being connected to the supply line and return line.

DETAILED DESCRIPTION

Figure 1:
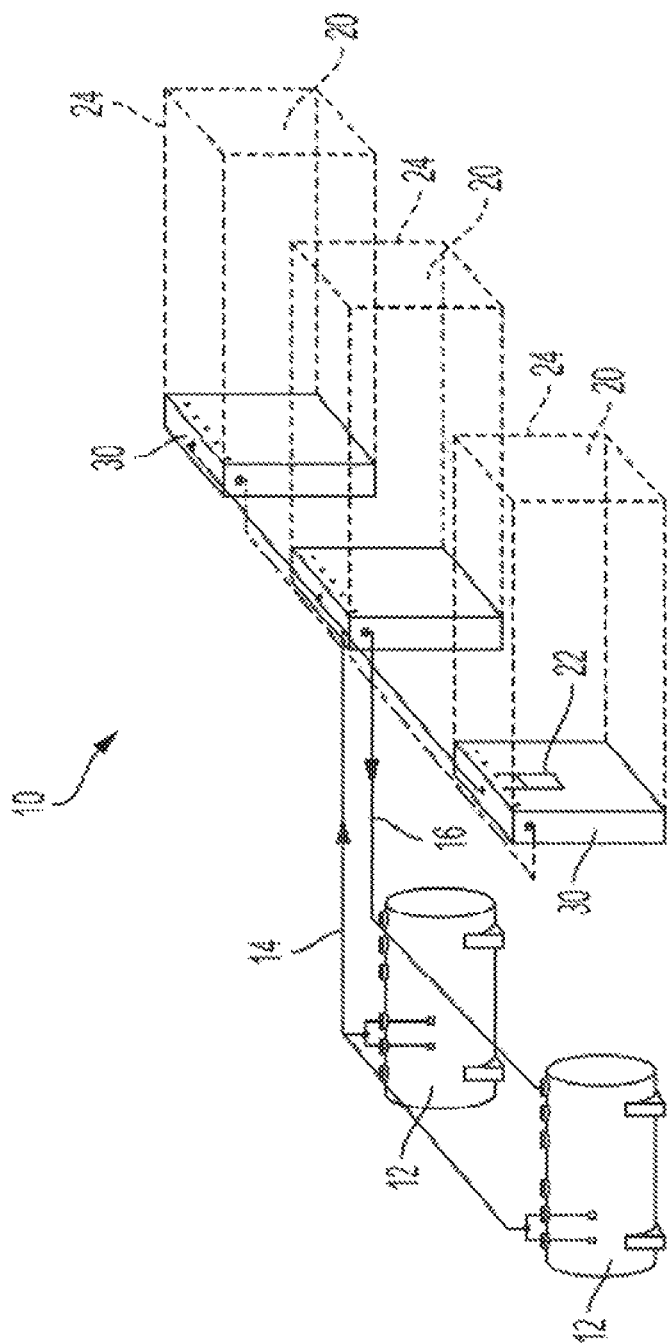
FIG. 1 is a view of a fuel system according to one aspect of the present invention

A fuel system without the disadvantages of belly tank fuel storage is provided herein. Referring to FIG. 1, fuel system 10 for supplying fuel to enclosed generating units 20 includes one or more bulk storage tanks 12 and one or more vertically-oriented day tanks 30. The fuel system 10 also includes supply line 14 from the hulk storage tank 12 to the vertical day tank 30. A return line 16 returns excess fuel from vertical day tank 30 to the bulk storage tank 12. An example of a fuel system 10 having two bulk storage tanks 12 providing fuel to three enclosed generating units 20, each equipped with a vertical day tank 30, is illustrated in FIG. 1.

Figure 2:
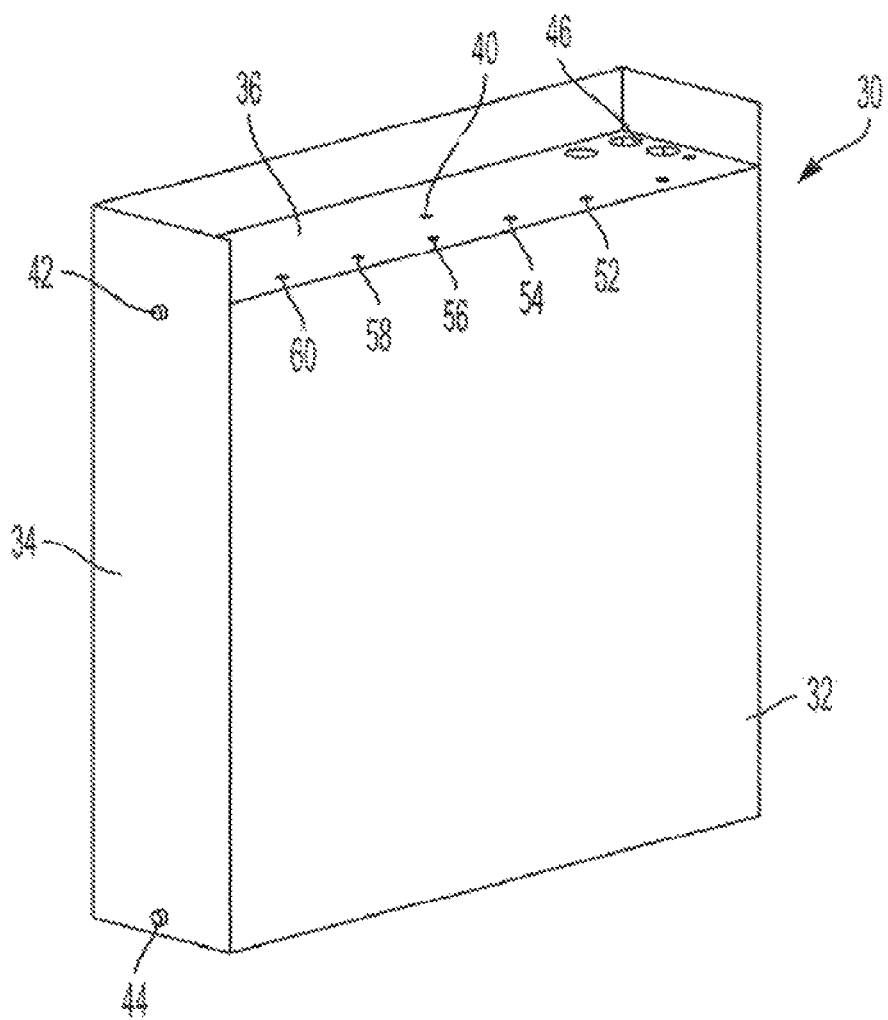
FIG. 2 is a detailed view of an example of a wall day tank according to another aspect of the present invention.

Referring to FIG. 2, vertical day tank 30 is a vertically oriented tank for providing a reservoir of fuel to a fuel system of an engine of an enclosed generator unit. In some embodiments, the vertical day tank 30 has a bottom wall (not illustrated), a top wall 36, an interior wall 32, side walls 34 and a back wall 38. Interior wall 32 is not interior to the day tank 32, but is enclosed in or comprises part of enclosure 24.

The walls of the vertical day tank 30 are dimensioned in at least one direction to approximately match a width and/or height of an enclosure 24 for the generator unit 20. In the illustrated example, the interior wall 32, back wall 38, and top and bottom walls are dimensioned in a first direction to be 138 inches to match a width of enclosure 24. In some embodiments, interior wall 32, back wall 38, and side walls 34 are dimensioned in a second direction to approximately match a height of the enclosure 24. In some embodiments, interior wall 32 is dimensioned to be shorter than side walls 34 to provide room within the enclosure 24 for fuel lines and vents fitted to top wall 36. In the illustrated example, the interior wall 32 is 124 inches in the second direction and side walls 34 and back wall 38 are 136 inches in the second direction. The dimensions of any particular wall will vary to match the dimensions of any given generator enclosure.

The top wall 36, bottom wall, and side walls 34 are dimensioned to provide sufficient depth in the vertical day tank 30 to achieve a desired volume for the vertical day tank 30, such as 2,000 gallons. In this sense, the "depth" of the vertical day tank 30 refers to a dimension orthogonal to the height and width of the enclosure 24. In some embodiments, 36 inches of depth is provided.

Vertical day tank 30 farther includes a fill port 40, overfill port 42 and a drain port 44. Supply line 14 is coupled to fill port 40 and return line 16 is coupled to overfill port 42. Additional ports may be included on the lop wall 36, such as vent ports 46, a generator supply port 52, a generator return port 58, a fuel polisher supply port 54 and a fuel polisher return port 56. Spare ports 60 may also be included.

In some embodiments, the vertical day tank 30 is mounted on an end wall of the enclosure 24. In some embodiments, the vertical day tank 30 is enclosed in and mounted on an end wall of the enclosure 24. In some embodiments, the first tank is constructed so that it provides an end wall of the enclosure. In this respect, any of the embodiments of the vertical day tank 30 may be referred to as a "wall day tank".

The vertical day tank 30 is filled from a cylindrical bulk storage tank 12. A feed pump in the bulk storage tank 12 provides fuel to the vertical day tank 30 through the supply line 14, and return line 16 returns over-filled fuel to the bulk storage tank 12 by gravity. The bulk storage tank 12 may comprise a cylindrical 5000-gallon tank.

The vertical day tank 30 illustrated in FIG. 2 has a capacity of approximately 2000 gallons. For a 2 MW generator, that can equate to around 96 hours of run time without refiling. This falls in line with the increasing requirements for 96 hours run time on mission critical backup power. In this sense, vertical day tank 30 is not limited to one day's worth of fuel capacity. Instead, "day tank" refers to a tank providing fuel for immediate access by a fuel system of a given generator unit, as distinguished from bulk storage. This reduces the need for on-site bulk storage of fuel, but may exacerbate fuel contamination issues associated with low fuel turnover.

Figure 3:
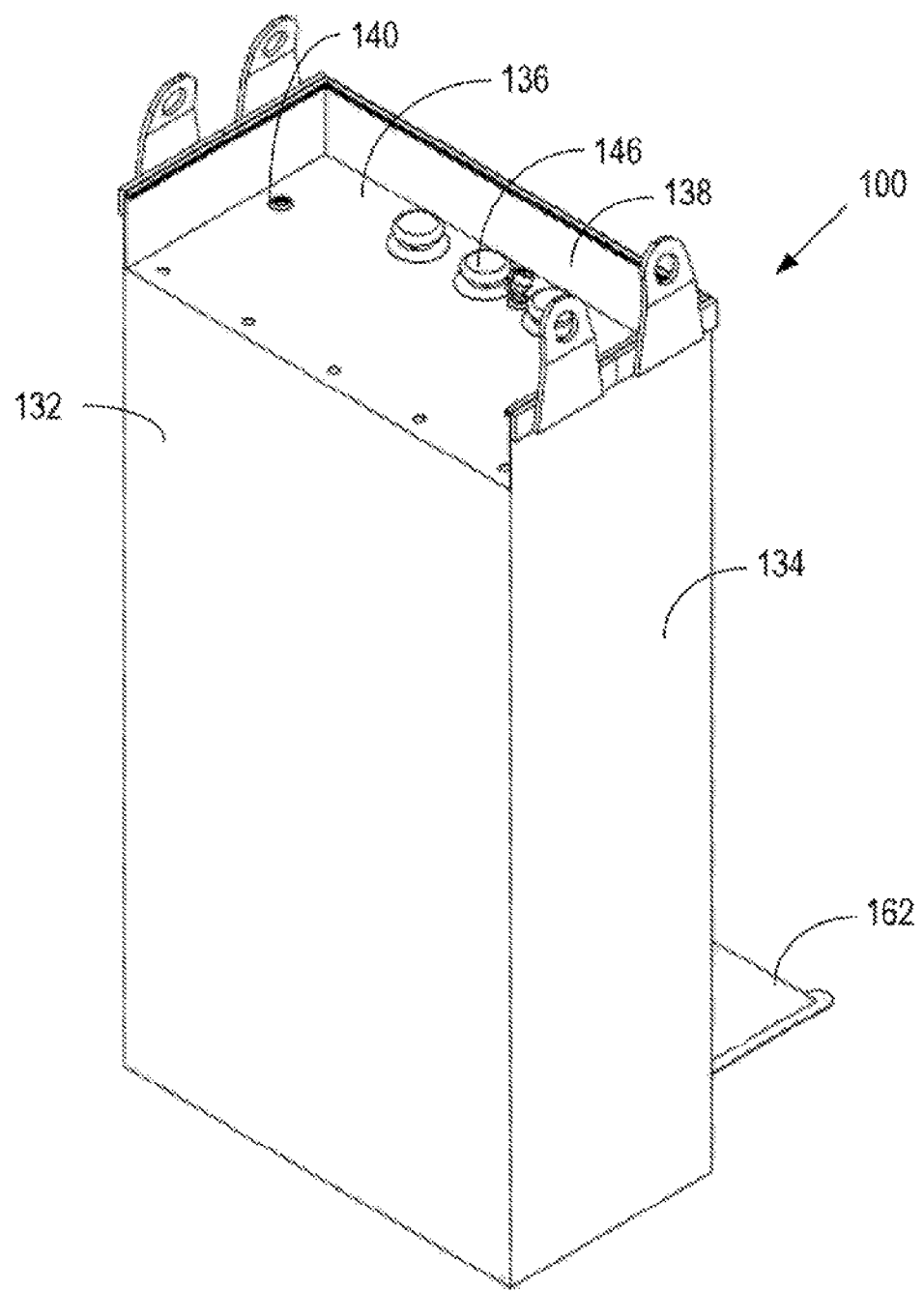
FIG. 3 is a detailed view of another example of wall day tank according to another aspect of the present invention.

An alternate embodiment of a vertical day tank 100 for use in fuel system 10 is illustrated in FIG. 3. Vertical day tank 100 is a vertically oriented tank for providing a reservoir of fuel to a fuel system of an engine of an enclosed generator unit. In some embodiments, the vertical day tank 100 has a bottom wall (not illustrated), a top wall 136, an interior wall 132, back wall 138 and side walls 134.

The bottom wall, a top wall 136, interior wall 132, and back wall 138 are dimensioned in a first direction to approximately match a width and/or height of an enclosure for the generator unit 20. In the illustrated example, the walls may be 69 inches in a first direction to match a width of the enclosure. In some embodiments, interior wall 132, back wall 138 and/or side walls 134 are dimensioned in a second direction to approximately match a height of the enclosure. In some embodiments, interior wall 132 is dimensioned in the second to be shorter than side walls 134 and back wall 138 to provide room within the enclosure for fuel lines and vents fitted to top wall 136. In the illustrated example, the interior wall 132 is 124 inches and side walls 134 and back wall 138 are 136 inches. A bracket 162 may be included to assist in mounting the vertical day tank 100 on, as part of, or directly adjacent to a generating unit's enclosure.

The top wall 136, bottom wall, and side walls 134 are dimensioned to provide sufficient depth in the vertical day tank 100 to achieve a desired volume for the wall vertical day tank 100, such as 1,250 gallons. In some embodiments, 36 inches of depth is provided.

As with the vertical day tank 30 illustrated in FIG. 2, vertical day tank 100 includes a fill port 140. An overfill port and a drain port are also included as illustrated with respect to vertical day tank 30, but not on a side wall 134 not visible in FIG. 3. Supply line 14 is coupled to fill port and return line 16 is coupled to overfill port. Additional ports may be included on the top wall 136, such as vent ports 146, a generator supply port 152, a generator return port 158, a fuel polisher supply port 154 and a fuel polisher return port 156.

Several advantages may be achieved with the above designs. The overall footprint of the vertical day tank 30 is significantly less than that of a belly tank due to the increased vertically while maintaining a similar fuel capacity. Extending the day tanks 30, 100 to the full widths and heights of their respective associated enclosures maximizes fuel storage capacity without exceeding the respective dimensions of the enclosures.

The area in plan view of day tanks 30, 100 are also greatly reduced relative to a belly tank of similar capacity, reducing the potential area for a fuel/water interface, thereby reducing the rate at which sludge or other sediments can be generated by microbial or fungal activity. For example, a conventional belly tank may be approximately 138 inches by 286 inches to match a footprint of a generating unit. Thus results in the bottom of the belly tank having almost 40,000 square inches of area. In contrast, the vertical day tank 30 of FIG. 2 is 138 inches by 36 inches, resulting in a bottom that has an area of almost 5,000 inches, which results in an eight-fold reduction in area where a fuel/water boundary layer would form.

The need for return transfer pumps is also reduced. Submersible pumps can be used on the bulk storage tanks 12 to transfer fuel to one of more wall day tanks 30. Once fuel level outpaces the fuel burn rate of the engine and begins to fill the wall mounted day tank, the overfill port 42 will be used as a gravity feed to the bulk storage tank 12 since the overfill port 42 will be physically higher than the fluid level in the bulk storage tanks 12.

Because the vertical day tank 30 is not required to support the immense weight of the generator, baffles may be eliminated or reduced in number. This, in combination with a smaller cross-sectional footprint, results in improved flow conditions for better fuel maintenance (polishing). With a relatively short distance horizontally between fuel filtration system suction and return, high tank bottom flow velocity can be obtained. Since the vertical day tank 30 is shallow (in depth), flow velocity will be high since the fluid flow path is sandwiched between the walls.

In some embodiments, fuel maintenance/transfer products 22 are mounted directly to the interior wall 32 of the vertical day tank 30. This may include, for example, one or more fuel polishing units. A uni-strut may be welded to the tank for integration and installation within the engine enclosure.

In case of tank rupture, the wall day tank can be easily removed once it is dismounted from the generator enclosure. This is in contrast to the case of a belly tank being compromised, in which the entire engine, generator and enclosure must be removed. In addition, since the ports on the day tanks are all similar, modular powerplant systems can be implemented as illustrated in FIG. 1.

The foregoing examples are for illustrative purposes, and the invention is not limited to these examples. Persons skilled in the art will understand that variations on the above structures and uses may be made without departing from the spirit of the invention.

What is claimed is:

1. A fuel system for a generating unit disposed within an enclosure, the enclosure having an enclosure width and an enclosure height, the fuel system comprising:
   a bulk fuel storage tank;
   a vertical day tank, the vertical day tank having a vertical day tank width approximately matching the enclosure width, a vertical day tank height approximately matching the enclosure height, the vertical day tank further having a fill port and an overfill port;
   a supply line from the bulk fuel tank to the fill port of the vertical day tank; and
   a return line from the overfill port of the vertical day tank to the bulk fuel storage tank;
   wherein the overfill port is located above a fuel level of the bulk fuel storage tank to provide a gravity-fed return line; and
   wherein the vertical day tank comprises a back wall dimensioned to match the height of the enclosure and the vertical day tank further comprises an end wall of the enclosure.

2. The fuel system of claim 1, wherein an area defined by the vertical tank width and vertical tank depth is substantially reduced relative to a belly tank of equivalent fuel capacity.

3. The fuel system of claim 1, further comprising a plurality of vertical day tanks associated with a plurality of respective generating units and enclosures, each vertical day tank being connected to the supply line and return line.

4. The fuel system of claim 1, further comprising a fuel polishing unit mounted to a wall of the vertical day tank.

* * * * *